Figure 1:
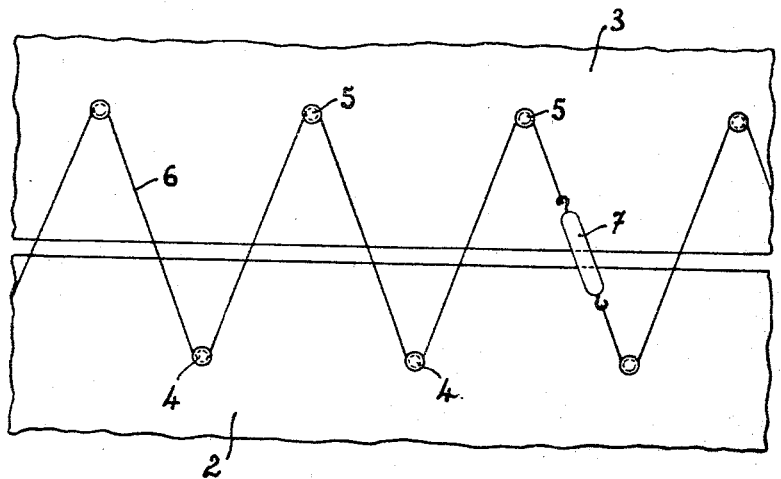

United States Patent Office 3,330,010
Patented July 11, 1967

3,330,010
ARRANGEMENT FOR INTERCONNECTING TWO MECHANICAL PARTS
Henry De Jean, Cannes, France, assignor to Richier, Paris, France, a company of France
Filed Jan. 25, 1965, Ser. No. 427,581
Claims priority, application France, Jan. 25, 1964, 961,577, Patent 1,385,786
3 Claims. (Cl. 24—140)

The present invention has for its object an arrangement applicable to all apparatus or machines including two parts provided with a multiplicity of points at which they are interconnected and adapted to move elastically with reference to each other to a small extend so as to eliminate any damaging effects such as those which may arise under the action of shocks.

For the execution of such connections assemblies are generally resorted to which include a plurality of bolts each extending longitudinally through a helical spring urging against each other the two parts to be assembled. Said conventional assembling method satisfies, it is true, the conditions sought for, to wit: a connection between said two parts with a possibility of a relative elastic shifting between said parts, but the dismantling and even the reassembling of the two associated parts, for instance for cleaning, upkeep or repair purposes, form tedious operations since they require the dismantling and the reassembling of all the bolts and springs and also, of course, an adjustment of the tensioning of each spring.

The present invention overcomes said drawbacks and it has, as a matter of fact, for its object a novel application for this purpose of a somewhat elastic cable connection, said cable passing as a lace forming loops over anchoring points provided alternatingly on the two parts to be assembled so as to act both as a connecting member between said parts and as an elastic member allowing a relative predetermined shifting between said two parts.

For the execution of such a connection, it is sufficient consequently to provide on the two parts to be assembled a plurality of hooks or rollers and to cause the cable to pass in alternation over the hooks or rollers belonging to both parts, in the manner of a lace, the tensioning of the cable being preferably adjusted through the agency of a tensioning member while its elasticity may be associated with that of an additional elastic system constituted by a spring for instance. In all cases, the dismantling and reassembling of the two parts form speedy operations of easy execution since they respectively require only the engagement and disengagement of the cable with reference to the elements such as hooks, rollers or the like provided for assembling purposes on the two parts.

Said connecting means may of course be applied in a manifold manner and thus they are particularly suitable, inter alia, for gyratory crushing machines provided with conical crushing members and wherein the vat is to be rigidly secured to the frame while a certain shifting is to be allowed between said two parts so as to limit the stresses exerted by the crushing. In this particular case, the connection between the frame and the vat is ensured conventionally by helical springs associated with bolts extending in parallelism with one another distributed along the periphery of the vat and connecting the latter with the frame of the apparatus, which means that the dismantling operation is a lengthy matter when it is necessary to separate the vat from the frame, for instance with a view to replacing the worn parts. The improved connecting system according to the invention is therefore particularly suitable in this case.

Figure 2:
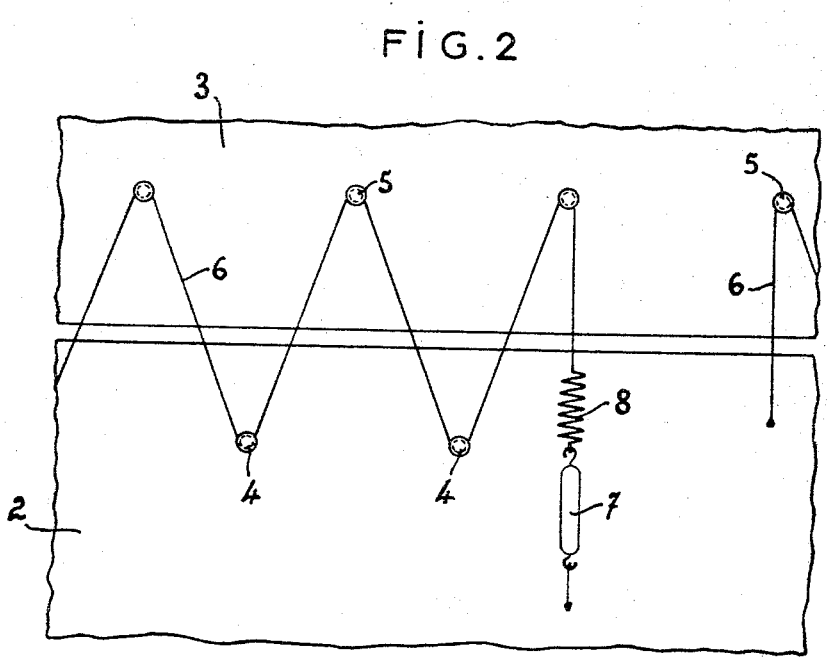

The accompanying drawings diagrammatically illustrate by way of example and in a non-limiting sense two embodiments of the improved connection according to the invention in the case of its application to rotary crushing machines incorporating conical crushing members. In said drawings:

FIGS. 1 and 2 illustrate in a highly diagrammatic manner a part of the development of the frame and of the vat of the crushing machine on a plane.

In said figures, 2 and 3 designate respectively the frame and the vat of the crushing machine. Said frame and vat carry on parallel horizontal spindles rollers, respectively designated by 4 and 5. The connection between the frame 2 and the vat 3 is ensured in a particularly simple manner by a metal cable 6 extending in alteration over the rollers 4 of the frame 2 and over the rollers 5 of the vat 3 in the manner of a lace. Said cable 6 acts not only as a member connecting the frame 2 with the vat 3, but also as an elastic member allowing the vat 3 to be slightly shifted with reference to the frame 2 in order to limit the crushing stresses to a predetermined value.

In the case illustrated in FIG. 1, tensioning means 7 are inserted in the cable 6 so that it is possible to subject the latter to the desired tensioning value. In the case illustrated in FIG. 2, said tensioning means are associated with a spring 8 which increases the elasticity of the cable 6.

It will be readily understood that the mere operation of the tensioning means 7 allows in both cases releasing the cable 6 with reference to the rollers 4 and 5 on the frame and vat and consequently separating the two last-mentioned parts.

What I claim is:

1. A method comprising detachably connecting the frame and the vat of a rotary crusher to enable relative transverse and longitudinal movement therebetween by steps including winding an elastic cable in alternation over regularly offset securing elements on said frame and vat, and regulating the tension in said cable by means of a tensioning device connected thereto.

2. A method as claimed in claim 1, comprising supplementing the elasticity of the elastic cable by connecting a spring thereto.

3. Apparatus comprising two rigid members having surfaces facing one another, anchoring means distributed in staggered formation on the two members on either side of said surfaces, means engaging said anchoring means to urge the members into engagement along said surfaces, with a predetermined force and with a specific degree of elasticity, said means comprising an elastic cable wound in alternation over the anchoring means on the rigid members and furnishing elastic connection between said members, and tensioning means connected to said cable to regulate the degree of tension therein, and wherein said two rigid members are the vat and the frame of a gyratory crusher, the vat being adapted for undergoing movement relative to the frame to limit the stresses exerted by the crushing operation.

References Cited
UNITED STATES PATENTS

| | | |
|---|---|---|
| 336,580 | 2/1886 | Masse. |
| 1,202,473 | 10/1916 | Birtwistle et al. _____ 24—140 |
| 1,490,091 | 4/1924 | Carver. |
| 1,584,926 | 5/1926 | Hale _____ 24—140 X |
| 2,916,902 | 12/1959 | Wamsley _____ 248—361 X |

FOREIGN PATENTS

| | | |
|---|---|---|
| 449,612 | 12/1912 | France. |
| 1,325,825 | 3/1963 | France. |
| 5,698 | 4/1897 | Norway. |

WILLIAM FELDMAN, Primary Examiner.
DONALD A. GRIFFIN, Examiner.